United States Patent
Moeller (10) Patent No.: US 12,389,842 B2
(45) Date of Patent: Aug. 19, 2025

(54) SYSTEM AND METHOD FOR DETECTING END GUN STATUS

(71) Applicant: Valmont Industries, Inc., Omaha, NE (US)

(72) Inventor: Mark Moeller, Valley, NE (US)

(73) Assignee: Valmont Industries, Inc., Omaha, NE (US)

( * ) Notice: Subject to any disclaimer, the term of this patent is extended or adjusted under 35 U.S.C. 154(b) by 531 days.

(21) Appl. No.: 17/373,850

(22) Filed: Jul. 13, 2021

(65) Prior Publication Data

US 2022/0030783 A1 Feb. 3, 2022

Related U.S. Application Data

(60) Provisional application No. 63/058,560, filed on Jul. 30, 2020.

(51) Int. Cl.
| | |
|---|---|
| *A01G 25/00* | (2006.01) |
| *A01G 25/09* | (2006.01) |
| *B05B 12/00* | (2018.01) |
| *G05D 7/06* | (2006.01) |

(52) U.S. Cl.
CPC ............ *A01G 25/00* (2013.01); *B05B 12/006* (2013.01); *G05D 7/0676* (2013.01); *A01G 25/092* (2013.01)

(58) Field of Classification Search
CPC .... A01G 25/00; A01G 25/092; A01G 25/167; A01G 25/16; A01G 27/003; B05B 12/006; B05B 12/004; B05B 3/18; B05B 12/08; G05D 7/0676
USPC ........................................................ 702/50
See application file for complete search history.

(56) References Cited

U.S. PATENT DOCUMENTS

| | | | |
|---|---|---|---|
| 7,584,023 B1 | 9/2009 | Palmer et al. | |
| 10,561,061 B2* | 2/2020 | Leeb .................... | A01C 23/047 |
| 2012/0043395 A1* | 2/2012 | Hill ....................... | B05B 12/008 239/69 |
| 2013/0087640 A1* | 4/2013 | Pfrenger ............... | A01G 25/092 239/723 |
| 2013/0226356 A1 | 8/2013 | Pfrenger et al. | |

(Continued)

FOREIGN PATENT DOCUMENTS

CN        109101032 B   *   8/2023  ............. G01C 21/10

OTHER PUBLICATIONS

International Application PCT/US21/41356, International Search Report and Written Opinion mailed Oct. 20, 2021, 9 pages.

*Primary Examiner* — Lisa M Caputo
*Assistant Examiner* — Joshua L Forristall
(74) *Attorney, Agent, or Firm* — Milligan PC LLO (57) ABSTRACT

The present invention provides a system and method for using a small, wireless gyroscopic sensor to monitor end gun operations. Further, the present invention provides a system and method for using an accelerometer to detect vibrations at the end gun. According to further preferred embodiments, the present invention includes a diagnostic application which receives gyroscopic sensor data and accelerometer data. The diagnostic applications of the present invention preferably include logic and threshold limits which are applied to the received data. The present system preferably provides notifications and warnings based on detected changes in rotational motion, orientation changes and vibration levels in and around the end gun.

18 Claims, 5 Drawing Sheets

(56) References Cited

U.S. PATENT DOCUMENTS

| | | |
|---|---|---|
| 2014/0277676 A1 | 9/2014 | Gattis et al. |
| 2015/0226177 A1 | 8/2015 | DeFrank et al. |
| 2016/0282219 A1* | 9/2016 | Kinoshita ............... G01M 3/24 |
| 2016/0330948 A1* | 11/2016 | Schnaider ............ A01M 7/0085 |
| 2019/0023313 A1* | 1/2019 | Zuzelski .............. B62D 5/0481 |
| 2020/0023395 A1* | 1/2020 | Tangen ................. B05B 12/006 |
| 2020/0154655 A1* | 5/2020 | Dick .................... A01G 25/092 |
| 2022/0030785 A1* | 2/2022 | Miller ...................... H04Q 9/00 |

* cited by examiner

SYSTEM AND METHOD FOR DETECTING END GUN STATUS

RELATED APPLICATIONS

The present application claims priority to U.S. Provisional Application No. 63/058,560 filed Jul. 30, 2020.

BACKGROUND AND FIELD OF THE PRESENT INVENTION

Field of the Present Invention

The present invention relates generally to a system and method for monitoring aspects of a mechanized irrigation system. More particularly, the present invention provides a system and method for detecting and monitoring the position and status of an end gun.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. Optionally, endguns may be attached to the end of any irrigation span to add further coverage. In use, endguns can greatly extend the reach and range of an irrigation system.

End guns operate at a given trajectory and over specific angles (i.e. half circle, full circle). Commonly, endguns are heavy duty impact sprinklers which include controllable valves to control the flow rate of the endgun. They may also include pressure boosting systems to extend the range of the endgun.

In present designs, end guns are independent from the detection and monitoring systems of the main irrigation system. Accordingly, end guns do not provide any feedback to the irrigation system, and operators must visually see the end gun during irrigation to assess whether the end gun is functioning properly. Wired systems and sensors have been used to monitor other elements of irrigation systems. However, these are difficult to use with end guns due to their distance from the main control panel and their continuous movement during irrigation. Further, transducers and simple water pressure measurements cannot provide a full assessment of how the end gun is functioning.

SUMMARY OF THE PRESENT INVENTION

To address the shortcomings presented in the prior art, the present invention provides a system and method for using a small, wireless gyroscopic sensor to monitor end gun operations. Further, the present invention provides a system and method for using an accelerometer to detect vibrations at the end gun.

According to further preferred embodiments, the present invention includes a diagnostic application which receives gyroscopic sensor data and accelerometer data. The diagnostic applications of the present invention preferably include logic and threshold limits which are applied to the received data. The present system preferably provides notifications and warnings based on detected changes in rotational motion, orientation changes and vibration levels in and around the end gun.

The accompanying drawings, which are incorporated in and constitute part of the specification, illustrate various embodiments of the present invention and together with the description serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module," "firmware" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage can include, for example, non-volatile memory (such as ROM) and volatile storage (such as RAM, buffers, cache memory, and network circuits).

Aspects of the systems and methods described herein may be implemented as functionality programmed into any of a variety of circuitry, including programmable logic devices and controllers (PLDs/PLCs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

Figure 1:
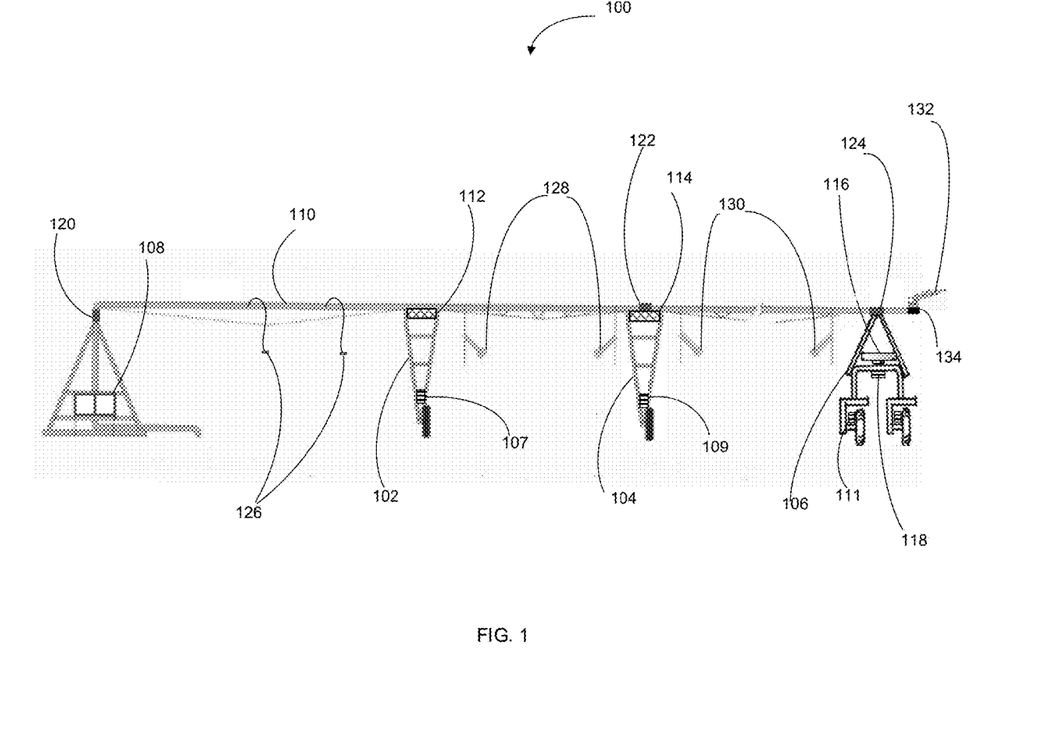
FIG. 1 shows an exemplary irrigation system for use with the present invention.

With reference now to FIG. 1, an exemplary system 100 incorporating aspects of the present invention shall now be discussed. According to a preferred embodiment, an exemplary irrigation system 100 may include a first drive tower 102, a last drive tower (LRDU) 104, and a corner drive tower 106. The drive towers 102, 104, 106 support connected spans 110 which carry water (or other applicants) to a variety of sprinklers 126 and to an end gun 132. As shown, the system may also include pressure sensors and regulators (transducers) 120, 122, 124 which are provided to control and regulate water pressure to the sprinklers 126 and the end gun 132. The end gun 132 may preferably include a sensor housing 134 which may include positional and vibrational sensors as discussed further below.

As shown, the each drive tower 102, 104, 106 may include a tower box 112, 114, 116 which are preferably interconnected to respective drive unit motors 107, 109, 111. Each tower box may include control boards, motor controllers, non-contact alignment devices and other components as further with respect to FIG. 3 below.

As further shown, the respective drive unit motors 107, 109, 111 preferably provide torque and braking to respective sets of drive wheels. As discussed above, the system of the present invention may include any suitable motor for providing torque to a drive wheel. According to a preferred embodiment, the system of the present invention may preferably include motors such as switch reluctance motors, induction motors and the like.

Further, the system 100 of the present invention may preferably further include a control/pivot panel 108 as well as elements such as GPS receivers 118 for receiving positional data. Still further, a system of the present invention may further include indirect crop sensors 128 which preferably may include optional moisture sensors to determine the moisture levels in a given area of soil. Additional sensors 130 may further include optics to allow for the detection of crop type, stage of grown, health, presence of disease, rate of growth and the like. Still further, the system may include ground sensors. Still further, the detection system may further receive data from a connected or remote weather station or the like which is able to measure weather features such as humidity, wind speed, wind direction, pressure, precipitation, temperature and the like. Further, the preferred system of the present invention may alternatively further include additional elements mounted to the span 110 such as additional sensors and the like.

Figure 2:
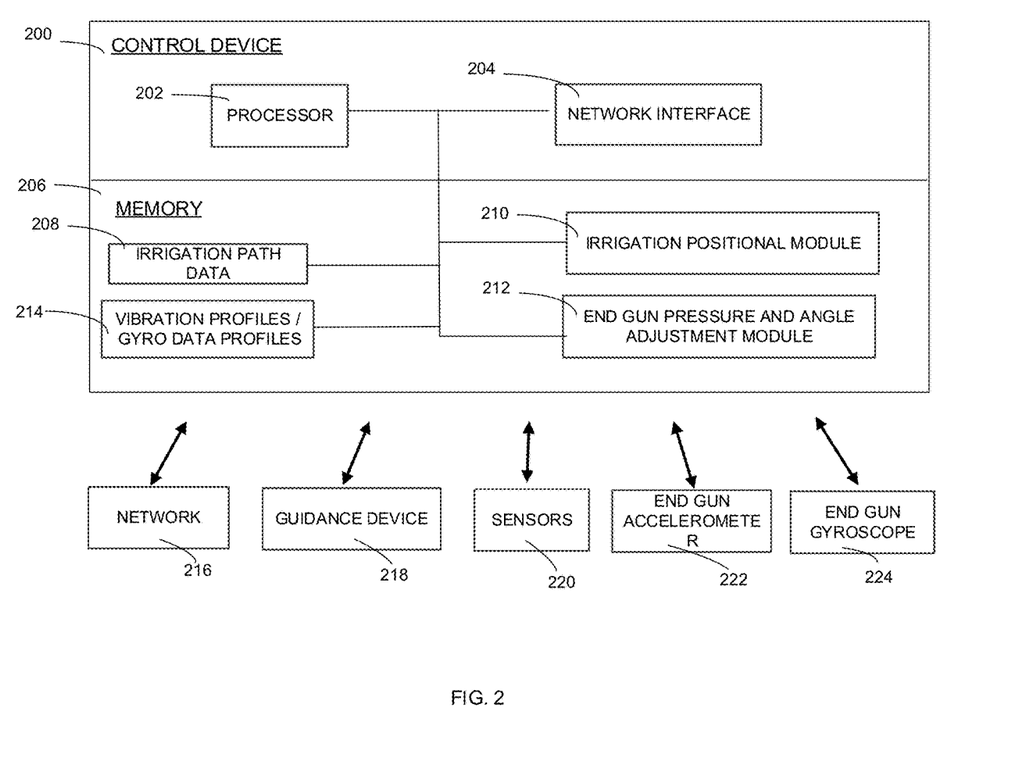
FIG. 2 shows a block diagram illustrating an exemplary processing architecture of a control device in accordance with a first preferred embodiment of the present invention.

With reference now to FIG. 2, an exemplary control device 200 which represents functionality to control one or more operational aspects of the irrigation system 100 will now be discussed. As shown, an exemplary control device 200 preferably includes a processor 202, a memory 206, an irrigation position module 210 and a network interface 204. The processor 202 provides processing functionality for the control device 200 and may include any number of processors, micro-controllers, or other processing systems. The processor 202 may execute one or more software programs that implement techniques described herein. The memory 206 is an example of tangible computer-readable media that provides storage functionality to store various data associated with the operation of the present invention, such as the software program and code segments mentioned above, or other data to instruct the processor 202 and other elements of the control device 200 to perform the steps described herein. The memory 206 may include, for example, removable and non-removable memory elements such as RAM, ROM, Flash (e.g., SD Card, mini-SD card, micro-SD Card), magnetic, optical, USB memory devices, and so forth. The network interface 204 provides functionality to enable the control device 200 to communicate with one or more networks 216 through a variety of components such as wireless access points, transceivers and so forth, and any associated software employed by these components (e.g., drivers, configuration software, and so on).

In implementations, the irrigation position-determining module 210 may receive data from a global positioning system (GPS) receiver or the like to calculate the location of the irrigation system 100. Further, the control device 200 may be coupled to a guidance device 218 or similar system of the irrigation system 100 (e.g., steering assembly or steering mechanism) to control movement of the irrigation system 100. As shown, the control device 200 may also preferably include multiple inputs and outputs to receive data from sensors 216-224 and monitoring devices as discussed further below.

The present invention may preferably also include an End Gun Pressure and Angle Adjustment Module 212 ("End Gun Module 212"). The End Gun Module 212 is preferably linked to systems which monitor, control and adjust end gun settings/parameters. The End Gun Module 212 preferably may receive and store data from an end gun accelerometer 222 and gyroscopic 224. According to preferred embodiments, the gyroscopic sensors 224 of the present invention may be any type of angular rate or angular velocity sensor. For example, the gyroscopic sensors 224 may be ring laser gyros, fiber-optic gyros or fluid gyros without limitation.

The accelerometer 222 and gyroscope 224 sensors may preferably be coupled with a wired or wireless transceiver for transmitting detected data to the processor 202 and the End Gun Module 212. In this way, the accelerometer 222 and gyroscope 224 sensors may preferably provide data for use with system diagnostics to determine the status and proper functioning of the end gun. According to an exemplary preferred embodiment, the End Gun Module 212 may use the received data to calculate oscillations within the span which may be parallel (forward/backwards rocking) or orthogonal (pushing/pulling within the span) to the direction of movement.

Figure 4:
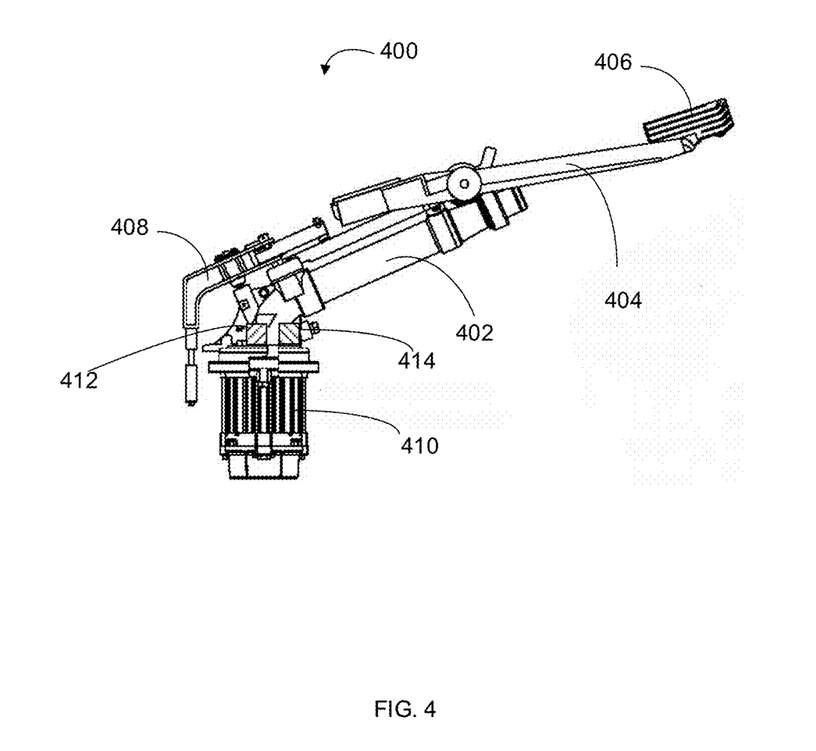
FIG. 4 shows an exemplary end gun configuration in accordance with a preferred embodiment of the present invention.

Additionally, the End Gun Module 212 may also compare the accelerometer 222 data to stored profiles of acceptable vibration levels based on the speed of the irrigation span, the water pressure and other factors such as stored vibration thresholds linked to irrigation path data 208. For example, the End Gun Module 212 may determine that a component of the end gun (i.e. the drive arm 404) may not be functioning properly or that the water pressure is too low based on detected levels of vibrations within the end gun.

The End Gun Module 212 may likewise compare the gyroscope 224 data with stored gyroscopic sensor data for irrigation plan thresholds for given time segments and water pressures (i.e., gyroscopic data profiles 214). For example, the End Gun Module 212 may determine that the end gun is not functioning properly based on a detected rate of angular travel over a given time period at a given water pressure. Conversely, the End Gun Module 212 may calculate/detect water pressure based on a detected rate of angular travel.

Figure 3:
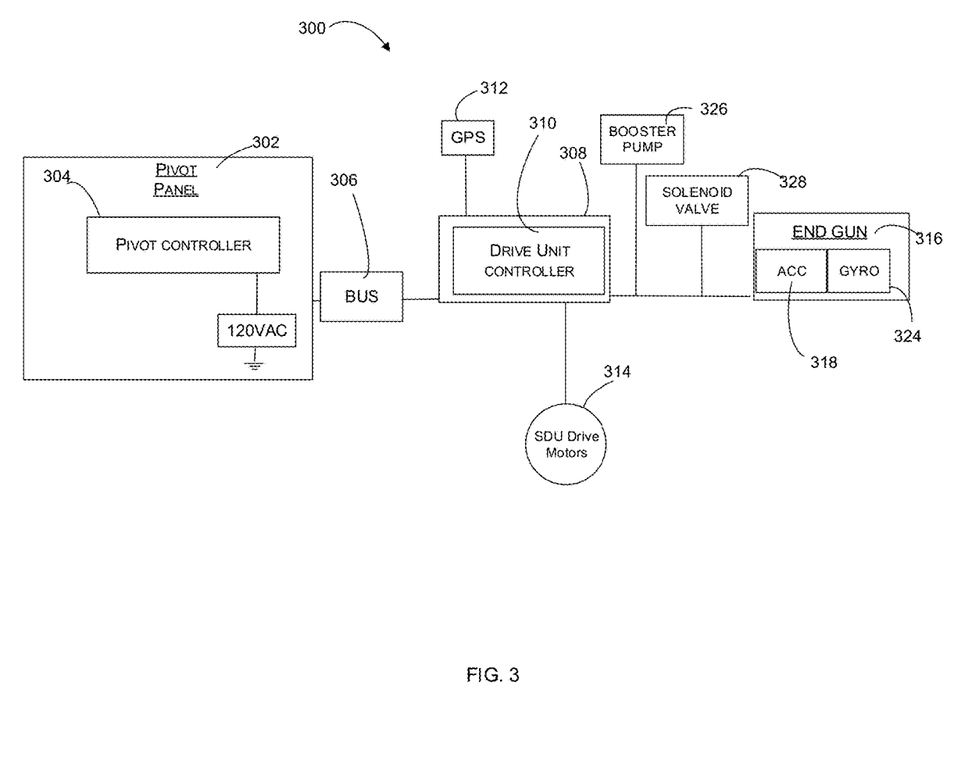
FIG. 3 shows a block diagram illustrating an exemplary system architecture in accordance with further aspects of the present invention.

With reference now to FIG. 3, an exemplary control system 300 in accordance with a preferred embodiment of the present invention shall now be discussed. As shown in FIG. 3, the control/pivot panel box 302 of the present invention may preferably include a main pivot controller 304 which controls and directs signals and power to downstream tower boxes/units 308 via a signal/power bus 306 or the like. The tower boxes/units 308 may include components such as drive unit controllers 310, GPS sensors 312 and drive motors 314.

According to a first preferred embodiment, the pivot panel box 302 may provide power and control signals through a pivot point PLC board via a power-line BUS. Alternatively, any other type of control and communication systems may also be used. For example, the signals of the present invention may be transmitted between system elements using any wireless (e.g. Wi-Fi, Zigbee) or wired protocol (e.g. PLC, ethernet). Further, the present invention is not intended to be limited to the use of solid-state tower boxes. For example, electro-mechanical tower boxes may be used with or without a PLC system without departing from the scope of the present invention.

As further shown in FIG. 3, the system may preferably further include an end gun 316 which may be serially connected with a booster pump 326 and a solenoid valve 328 or the like to control water flow to the end gun 316. According to a preferred embodiment, the end gun 316 may preferably be mechanically connected to an accelerometer 318 and/or a gyroscopic sensor 324. The accelerometer 318 may preferably be attached to the end gun 316 to detect vibrations experienced by the end gun 316 during its operations. The gyroscopic sensor 324 may preferably be attached to and oriented with the end gun 316 to detect and transmit the angular velocity and orientation of the end gun 316 as discussed further below.

With reference to FIG. 4, an exemplary end gun system 400 in accordance with a preferred embodiment of the present invention shall now be discussed. As shown in FIG. 4, the end gun system 400 may include an end gun main body 402, a drive arm 404, a drive spoon 406, a trip lever 408 and a bearing 410 which may allow the end gun main body 402 to swivel. The end gun system 400 may preferably further include accelerometer 412 and/or gyroscopic sensor 414 as discussed above.

Figure 5:
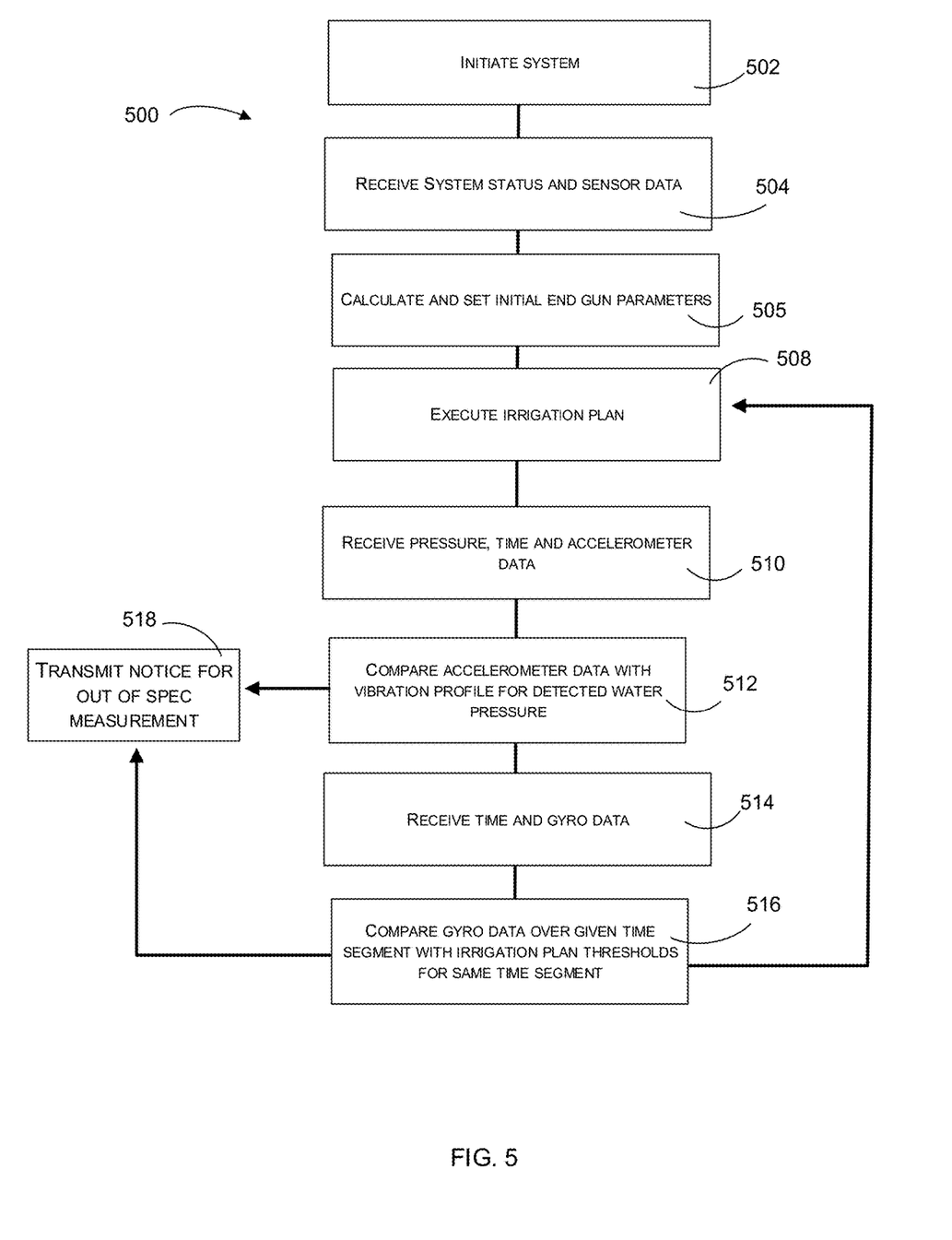
FIG. 5 shows a flow chart illustrating an exemplary method in accordance with a first preferred embodiment of the present invention.

With reference now to FIG. 5, an exemplary method 500 shall now be discussed. As shown in FIG. 5, at a preferred first step 502, the system is preferably initiated and/or powered up. At a preferred second step 504, the system preferably receives a status update from any linked sensors. At a third step 505, the system preferably loads, calculates and/or sets initial end gun parameters. These may include ranges of acceleration/vibration values (i.e., acceleration profile data 214) for given ranges/levels of detected water pressures, locations and the like. These may further include ranges of acceptable orientations/angular velocities for the end gun for given segments of time within an irrigation program or over given ranges of locations (i.e., gyroscopic data ranges).

At a next step 508, the system may preferably execute a given stored irrigation plan. At a next step 510, the system may receive accelerometer, gyroscopic, water pressure and/or time data. At a next step 512, the system preferably compares the received accelerometer data with a stored acceleration/vibrational event profile for the detected water pressure and/or other irrigation plan parameter(s). If the received accelerometer data is outside of accepted thresholds for the given water pressure or irrigation plan parameter, the system may preferably transmit a notice to the operator (step 518).

According to a preferred embodiment, the system may compare received accelerometer data with acceleration/vibrational event profile data stored in one or more look-up tables. Preferably, an exemplary look-up table may link acceleration/vibrational event range values with stored water pressure range values and/or time segment values. In this way, the system of the present invention may determine whether the magnitude of a detected acceleration event falls outside of a given, stored acceleration/vibrational range linked to a detected water pressure value (or range of values), or a given time segment of a given irrigation plan.

At a next step 514, the system preferably receives time and gyroscopic data. At a next step 516, the system preferably compares the received gyroscopic data with acceptable gyro ranges/thresholds/settings for the detected time segment. As above, if the received gyroscopic sensor data is outside of accepted thresholds for the gyro ranges/thresholds/settings for the detected time segment, the system preferably transmits a notice to the operator (step 518). Thereafter, the system preferably returns to step 508 and continues executing the irrigation plan.

As discussed above, the system may compare received gyroscopic data with gyroscopic data stored as gyroscopic profile data stored in one or more look-up tables. Preferably, an exemplary look-up table may link gyroscopic event range values (i.e., a discrete value or range of values) with stored end gun orientation/angular velocity range values for a determined time segment and/or water pressure range values. In this way, the system of the present invention may determine whether the magnitude of a gyroscopic event (i.e., a detected orientation, change in orientation, an angular velocity or a change in angular velocity) falls outside of a given, stored gyroscopic range linked to a given detected water pressure value, acceleration value, and/or time segment of a given irrigation plan.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for monitoring an end gun within an irrigation system, wherein the method comprises:
receiving a status confirmation from a plurality of linked sensors; wherein the plurality of linked sensors comprise a gyroscopic sensor; wherein the gyroscopic sensor is configured to detect at least one of an angular velocity and orientation of the end gun;
storing a first set of acceleration profile data; wherein the first set of acceleration profile data comprises a first look-up table linking a first set of vibrational range values with a first set of water pressure range values;
storing gyroscopic profile data; wherein the gyroscopic profile data comprises a gyroscopic look-up table linking a first set of end gun orientation range values to a first set of time segment range values;

executing a stored irrigation plan;

receiving accelerometer sensor data, water pressure sensor data, gyroscopic sensor data and time segment data;

comparing the received accelerometer sensor data to an acceleration range value linked to the water pressure sensor data;

comparing the received gyroscopic sensor data to an end gun orientation range value linked to the time segment data;

transmitting a first notice if the received accelerometer sensor data is outside of the acceleration range value linked to the water pressure sensor data;

transmitting a second notice if the received gyroscopic sensor data is outside of the end gun orientation value for the time segment data;

determining a functional status of the end gun based on received accelerometer sensor data; and determining the functional status of the end gun based on received gyroscopic sensor data.

2. The method of claim 1, wherein the method further comprises the step of: calculating oscillations within a span based at least in part on the received accelerometer sensor data and at least in part on the gyroscopic sensor data.

3. The method of claim 1, wherein the method further comprises the step of: calculating oscillations within a span which are parallel to a direction of travel of the span.

4. The method of claim 1, wherein the method further comprises the step of: calculating oscillations within a span which are orthogonal to a direction of travel of the span.

5. The method of claim 1, wherein the method further comprises the step of; determining that a component of the end gun is operating outside of a first set of parameters.

6. The method of claim 1, wherein the method further comprises the step of: determining that a detected water pressure level is below a predetermined level based at least in part on detected levels of vibrations within the end gun.

7. The method of claim 5, wherein the method further comprises the step of: determining whether an end gun is functional based on a detected rate of angular travel over a determined time period.

8. The method of claim 5, wherein the step of determining whether an end gun is functional is a based at least in part on a detected water pressure level.

9. The method of claim 8, wherein the method further comprises a step of: determining a water pressure level based at least in part on a detected rate of angular travel.

10. A method for monitoring an end gun within an irrigation system, wherein the method comprises:

receiving a status confirmation from a plurality of linked sensors; wherein the plurality of linked sensors comprise a gyroscopic sensor; wherein the gyroscopic sensor is configured to detect an angular velocity of the end gun;

storing a first set of acceleration profile data; wherein the first set of acceleration profile data comprises a first look-up table linking a first set of acceleration event range values with a first set of water pressure range values;

storing gyroscopic profile data; wherein the gyroscopic profile data comprises a gyroscopic look-up table linking a first set of end gun angular velocity range values to a first set of time segment range values;

executing a stored irrigation plan;

receiving accelerometer sensor data, water pressure sensor data, gyroscopic sensor data and time segment data;

comparing the received accelerometer sensor data to an acceleration range value linked to the water pressure sensor data;

comparing the received gyroscopic sensor data to an end gun angular velocity range value linked to the time segment data;

transmitting a first notice if the received accelerometer sensor data is outside of the acceleration range value linked to the water pressure sensor data;

transmitting a second notice if the received gyroscopic sensor data is outside of the end gun angular velocity range value for the time segment data;

determining a functional status of the end gun based on received accelerometer sensor data; and determining the functional status of the end gun based on received gyroscopic sensor data.

11. The method of claim 10, wherein the method further comprises the step of: calculating oscillations within a span based at least in part on the received accelerometer sensor data and at least in part on the gyroscopic sensor data.

12. The method of claim 10, wherein the method further comprises the step of: calculating oscillations within a span which are parallel to a direction of travel of the span.

13. The method of claim 10, wherein the method further comprises the step of: calculating oscillations within a span which are orthogonal to a direction of travel of the span.

14. The method of claim 10, wherein the method further comprises the step of: determining that a component of the end gun is operating outside of a first set of parameters.

15. The method of claim 10, wherein the method further comprises the step of: determining that the detected water pressure level is below a predetermined level based at least in part on detected levels of vibrations within the end gun.

16. The method of claim 14, wherein the method further comprises the step of: determining whether an end gun is functional based on a detected rate of angular travel over a determined time period.

17. The method of claim 14, wherein the step of determining whether an end gun is functional is a based at least in part on a detected water pressure level.

18. The method of claim 14, wherein the method further comprises a step of: determining a water pressure level based at least in part on a detected rate of angular travel.

* * * * *